(12) United States Patent
Henly

(10) Patent No.: US 6,361,573 B1
(45) Date of Patent: Mar. 26, 2002

(54) FUEL DISPERSANTS WITH ENHANCED LUBRICITY

(75) Inventor: Timothy J. Henly, Maidens, VA (US)

(73) Assignee: Ethyl Corporation, Richmond, VA (US)

( * ) Notice: Subject to any disclaimer, the term of this patent is extended or adjusted under 35 U.S.C. 154(b) by 0 days.

(21) Appl. No.: 09/386,634

(22) Filed: Aug. 31, 1999

(51) Int. Cl.$^7$ ................................ C10L 1/18; C10L 1/22
(52) U.S. Cl. ........................... 44/335; 44/386; 44/391; 44/399
(58) Field of Search .......................... 44/335, 386, 391, 44/399

(56) References Cited

U.S. PATENT DOCUMENTS

| | | | | |
|---|---|---|---|---|
| 3,254,025 A | * | 5/1966 | LeSuer | |
| 3,273,981 A | * | 9/1966 | Furey | |
| 3,287,273 A | * | 11/1966 | Furey et al. | |
| 3,697,428 A | * | 10/1972 | Widmer et al. | |
| 3,804,763 A | * | 4/1974 | Meinhardt | 44/386 |
| 3,948,800 A | * | 4/1976 | Meinhardt | 44/386 |
| 3,950,341 A | * | 4/1976 | Okamoto et al. | |
| 4,234,435 A | * | 11/1980 | Meinhardt et al. | |
| 5,041,622 A | * | 8/1991 | LeSuer | |
| 5,788,722 A | * | 8/1998 | Emert et al. | 44/386 |

FOREIGN PATENT DOCUMENTS

| | | | |
|---|---|---|---|
| EP | 0191967 A | * | 8/1986 |
| EP | 0476196 A1 | * | 3/1992 |
| EP | 0613938 | * | 9/1994 |
| FR | 2252868 A | * | 6/1975 |
| WO | WO 94/17160 | * | 4/1994 |
| WO | WO9616930 | * | 6/1996 |
| WO | WO9623855 A | * | 8/1996 |
| WO | WO9851763 A | * | 11/1998 |

* cited by examiner

*Primary Examiner*—Margaret Medley
(74) *Attorney, Agent, or Firm*—Dennis H. Rainear

(57) ABSTRACT

Reaction products of i) a hydroxyl-group containing compound; ii) an amine-group containing compound, wherein component ii) is different from component i); and iii) a hydrocarbyl-substituted succinic acylating agent provide improved detergency as well as improved lubricity to hydrocarbon fuels. Compositions comprising a hydrocarbon fuel and the reaction products are also disclosed.

17 Claims, No Drawings

FUEL DISPERSANTS WITH ENHANCED LUBRICITY

TECHNICAL FIELD

The present invention relates to fuel compositions comprising a dispersant additive for hydrocarbon fuels, such as gasoline and diesel fuel, wherein said dispersant additive is the reaction product of i) a hydroxyl-group containing compound; ii) an amine-group containing compound, wherein component ii) is different from component i); and iii) a hydrocarbyl-substituted succinic acylating agent.

BACKGROUND OF THE INVENTION

It has long been desired to maximize fuel economy and power in diesel engines while enhancing acceleration and preventing knocking and hesitation. Diesel fuel must ignite spontaneously and quickly (within 1 to 2 milliseconds) without a spark. The time lag between the initiation of injection and the initiation of combustion is called ignition delay. In high-speed diesel engines, a fuel with a long ignition delay tends to produce rough operation and knocking.

Two major factors affect ignition delay: the mechanical conditions in the engine and the chemistry of the fuel. The mechanical component is influenced by such factors as compression ratio, motion of the air charge during ignition and ability of the fuel injector to atomize fuel. The chemical component of ignition delay is influenced by such factors as the fuel's autoignition temperature, specific heat, density, viscosity, and other properties. The ability of a diesel fuel to ignite quickly after injection into a cylinder is known as its cetane number.

To minimize ignition delay in a diesel engine, it is desirable to enhance the mechanical component by maintaining the fuel injector's ability to precisely atomize fuel by keeping the injectors clean. However, this must be done in such a way that does not negatively affect the chemical component.

It would be beneficial to provide dispersant compositions that are highly effective in minimizing injector deposits in diesel engines, as well as intake valve deposits in gasoline engines, and that provide such an advantage without harm to the engine and without deterioration in engine performance.

Accordingly, one of the objects of the present invention is to provide a diesel fuel that provides effective detergency without attendant deterioration in engine performance.

Problems associated with fuel lubricity arose in the mid-1960's when a number of aviation fuel pump failures occurred. After considerable research, it was realized that advances in the refining of aviation turbine fuel had resulted in the almost complete removal of the naturally occurring lubricating components from the fuel. The removal of these natural lubricants resulted in the seizure of fuel pump parts. By the mid-1980's, it seemed likely that a similar problem was imminent in diesel fuel pumps. Fuel injection pump pressures had been steadily increasing while there was also a growing concern to reduce the sulfur content of the diesel fuel. The desire to reduce the sulfur content of the diesel fuel, in an effort to reduce pollution, required the use of more rigorous fuel refining processes. It was determined that as refining processes became more stringent, the naturally occurring sulfur, nitrogen and oxygen containing compounds and polyaromatics which contribute to diesel fuel's inherent lubricity were reduced or eliminated. In response to these developments, a number of effective lubricity additives were developed for diesel fuels. These additives are now widely used to enhance the lubricity of highly refined, low sulfur diesel fuels.

In certain types of in-line diesel injection pumps, engine oil contacts diesel fuel. Engine oil may also come into contact with the diesel fuel through direct addition of used engine oil to the fuel. Certain types of lubricity additives used in low sulfur diesel fuel have been found to contribute to fuel filter blockage and to pump plunger sticking. Lubricity additives having poor compatibility with engine oil have been shown to cause these problems. Compatibility is defined as the tendency for the diesel fuel containing the lubricity additive not to form fuel insoluble deposits, gels or heavy sticky residues when in contact with engine oil. These deposits, gels or residues have been shown to cause fuel filter blockage and injection pump sticking. The additives of the present invention are compatible with engine oil.

Gasoline fuels are also becoming subject to compositional constraints, including restrictions on sulfur content, in an effort to reduce pollutants. The principal concern is the effect of sulfur on exhaust catalyst life and performance. The lubricity requirements of gasoline are somewhat lower than for diesel fuel since the majority of gasoline fuel injection systems inject fuel upstream of the inlet valves and thus operate at much lower pressures than diesel fuel pumps. However, as automobile manufacturers desire to have electrically powered fuel pumps within the fuel tanks, failure of the pumps can be expensive to repair. These problems are also likely to increase as injection systems become more sophisticated and the gasoline fuels become more highly refined.

Additional pump wear concerns have arisen with the introduction of vehicles having direct injection gasoline (DIG) engines since the fuel pumps for these vehicles operate at significantly higher pressures than traditional gasoline fuel pumps.

Another area subject to pump wear and failure is the use of submerged fuel pumps in gasoline or diesel fuel storage tanks. It is important to reduce the wear of these submerged pumps due to the difficulty of accessing these pumps for repair and maintenance.

Many commercially available gasoline fuels contain gasoline detergents such as polyisobutylene amine and polyether amine. These compounds are known to have a minor effect on the wear properties of the fuel. A growing number of commercially available gasoline fuels contain oxygenates, such as methyltertiarybutylether (MTBE). These oxygenates are known to increase rates of wear of fuel pump components as they have very high friction coefficients. In light of the desire for more highly refined fuels, lower sulfur content and oxygenation of the fuels, there is presently a need for lubricity improvers for hydrocarbon fuels in order to obtain acceptable fuel pump life. The present invention addresses these problems by adding the novel succinic acid derivative reaction products to the fuel.

While the prior art is replete with numerous treatments for fuels, it does not disclose the addition of the present additives to hydrocarbon fuels or teach their use for providing enhanced detergency and lubricity to said fuels.

SUMMARY OF THE INVENTION

The present invention relates to the treatment of a hydrocarbon fuel to substantially reduce the wear occasioned upon fuel pumps used to pump said hydrocarbon fuels and to provide effective detergency to the fuels without attendant deterioration in engine performance. The present invention also relates to the discovery that the addition to a fuel of the reaction products of the present invention will improve detergency and lubricity as compared to a similar fuel that has not been treated with said reaction products.

Thus, there is disclosed a fuel composition comprising a major amount of a hydrocarbon fuel and a minor amount of a fuel-soluble dispersant obtained by reacting i) a hydroxyl-group containing compound; ii) an amine-group containing compound, wherein component ii) is different from component i); and iii) a hydrocarbyl-substituted succinic acylating agent. The dispersant additives are preferably present in the fuel in an amount within the range of from about 1 to about 1000 parts by weight of additive per million parts by weight of fuel (ppm w/w). More preferably, the dispersants are present in the fuel in an amount within the range from about 10 to about 500 ppm w/w, most preferably, from about 30 to about 300 ppm w/w.

There is also disclosed a method for reducing the wear of fuel pumps through which a hydrocarbon fuel is pumped, comprising adding a fuel-soluble additive to said fuel wherein the fuel-soluble additive comprises the above-described dispersant and wherein the dispersant additive is added to the fuel in an amount effective to improve the detergency and lubricity of the fuel, typically, the dispersant additive is present in the fuel composition in an amount of at least 1 ppm w/w.

In view of the problems discussed above, a general aspect of the present invention is to provide a fuel additive that gives improved detergency to the fuel and protects the fuel pump from excessive wear and breakdown. A further aspect of the invention is to provide a fuel additive suitable for addition to a fuel that does not damage the fuel system and does not cause an increase in undesirable combustion products.

DETAILED DESCRIPTION OF THE INVENTION

The additives of the present invention may be categorized as hydrocarbyl-substituted succinic acid amides and/or succinic acid esters and are fuel-soluble reaction products obtained by the reaction of i) a hydroxyl-group containing compound; ii) an amine- group containing compound, wherein component ii) is different from component i); and iii) a hydrocarbyl-substituted succinic acylating agent.

Reactants suitable for use as component i) of the present invention are hydroxyl-group containing compounds capable of reacting with the hydrocarbyl-substituted succinic acylating agent (component iii) to form a succinic acid ester, a succinic acid amide or mixtures thereof, and which possess at least one pendant hydroxyl group after reaction with component iii). The preferred reactants for use as component i) in the present invention are amino-alcohols containing secondary and/or tertiary amines; alkoxylated amines containing secondary and/or tertiary amines; polyols and mixtures thereof. Examples of suitable amino-alcohols include diethanolamine and triethanolamine; representative alkoxylated amines include ethoxylated and propoxylated amines and polyamines. An example of these amines includes, for example, 2-(methylamino)ethanol. Suitable polyols include glycerol, sorbitol and polyalkylene glycols. Most preferred for use as component i) is diethanolamine.

Reactants suitable for use as component ii) of the present invention are amine-containing compounds capable of reacting with the hydrocarbyl-substituted succinic acylating agent (component iii) to form a hydrocarbyl-substituted succinic acid ester, succinic acid amide or mixtures thereof, and which possess at least one pendant amine group after reaction with component iii). The preferred reactants for use as component ii) in the present invention include, but are not limited to, polyamines containing at least one secondary amine group and optionally at least one tertiary amine group, tertiary amino alcohols containing at least one hydroxy group and at least one tertiary amine, and polyamines containing a primary amine and at least one additional amino group.

Representative polyamines containing at least one secondary amine group and optionally at least one tertiary amine group include N-methyl piperazine, N,N,N",N"-tetraalkyldialkylenetriamines (two terminal tertiary amino groups and one central secondary amino group), N,N,N,'N", NN'"-pentaalkyltrialkylenetetramines (one terminal tertiary amino group, two internal tertiary amino groups and one terminal secondary amino group), and like compounds, wherein the alkyl groups are the same or different and typically contain no more than about 12 carbon atoms each, and which preferably contain from 1 to 4 carbon atoms each, and 3,3'-iminobis (N,N-dimethyl propylamine) having the structure $HN[(CH_2)_3N(CH_3)_2]_2$.

Representative tertiary amino alcohols containing at least one hydroxy group and at least one tertiary amine include N,N-dimethylethanolamine having the structure $HO—C_2H_4—N(CH_3)_2$.

Representative polyamines containing a primary amine and at least one additional amine group include alkylene polyamines having at least one suitably reactive primary amino group in the molecule. Other substituents may be present in the polyamine. In one embodiment, the alkylene polyamine is a polyethylene polyamine. Suitable alkylene polyamine reactants include ethylenediamine, diethylenetriamine, triethylenetetramine, tetraethylenepentamine, pentaethylenehexamine, hexaethyleneheptamine, heptaethyleneoctamine, octaethylenenonamine, nonaethylenedecamine, decaethyl-eneundecamine and mixtures of such amines having nitrogen contents corresponding to alkylene polyamines of the formula $H_2N—(A—NH—)_nH$, where A is divalent ethylene or propylene and n is an integer of from 1 to 10. The alkylene polyamines may be obtained by the reaction of ammonia and dihalo alkanes, such as dichloro alkanes. Thus, the alkylene polyamines obtained from the reaction of 2 to 11 moles of ammonia with 1 to 10 moles of dichloro alkanes having 2 to 6 carbon atoms and the chlorines on different carbon atoms are suitable alkylene polyamine reactants.

In another embodiment of the present invention, the amine useful as component ii) is a polyamine having at least one primary amino group and at least one tertiary amino group in the molecule. Examples of suitable polyamines N,N,N',N"-tetraalkyltrialkylenetetramines (one terminal tertiary amino group, two internal tertiary amino groups and one terminal primary amino group), tris(dialkylaminoalkyl) aminoalkylmethanes (three terminal tertiary amino groups and one terminal primary amino group), and like compounds, wherein the alkyl groups are the same or different and typically contain no more than about 12 carbon atoms each, and which preferably contain from 1 to 4 carbon atoms each. Most preferably these alkyl groups are methyl and/or ethyl groups. Suitable polyamine reactants include N, N-dialkyl- alpha, omega-alkylenediamine, such as those having from 3 to about 6 carbon atoms in the alkylene group and from 1 to about 12 carbon atoms in each of the alkyl groups, which most preferably are the same but which can be different. Most preferred is N,N-dimethyl-1,3-propanediamine.

The hydrocarbyl-substituted succinic acylating agents useful in the present invention is a hydrocarbyl-substituted succinic acylating agent in which the hydrocarbyl substituent contains an average of 50 to 100, preferably 64 to 80, carbon atoms.

The hydrocarbyl substituent of the acylating agent is preferably an alkyl or alkenyl group having the requisite number of carbon atoms as specified above. Alkenyl substituents derived from poly-alpha-olefin homopolymers or copolymers of appropriate molecular weight (e.g., propene homopolymers, butene homopolymers, C3 and C4 alpha-olefin copolymers, and the like) are suitable. Most preferably, the substituent is a polyisobutenyl group formed from polyisobutene having a number average molecular weight (as determined by gel permeation chromatography) in the range of 700 to 2100, preferably 800 to 1300, most preferably 900 to 1000. So-called high reactivity polybutylenes having relatively high proportions of polymer molecules having a terminal vinylidene group, formed by methods such as described, for example, in U.S. Pat. No. 4,152,499 and W. German Offenlegungsschrift 29 04 314, are also suitable for use in forming the hydrocarbyl substituted acylating agents of the present invention.

Hydrocarbyl-substituted succinic acid or anhydride acylating agents and methods for their preparation and use in the formation of succinimide are well known to those skilled in the art and are extensively reported in the patent literature. See for example the following U.S. Pat. Nos. 3,018,247; 3,018,250; 3,578,422; 3,658,494; 3,658,495; 3,912,764; 4,110,349 and 4,234,435, among others.

When utilizing the general procedures such as described in these and other patents, the important considerations insofar as the present invention is concerned, are to insure that the hydrocarbyl substituent of the acylating agent contain the requisite number of carbon atoms, that the acylating agent be reacted with the requisite amines and/or alcohols, and that the reactants be employed in proportions such that the resultant reaction products contain the requisite proportions of the chemically combined reactants, all as specified herein. When utilizing this combination of features, dispersants are formed which possess exceptional effectiveness in controlling or reducing the amount of deposits and exhaust emissions formed during engine operation as well as improved lubricity compared to conventional succinimide detergents.

The hydrocarbyl-substituted succinic acylating agents include the hydrocarbyl-substituted succinic acids, the hydrocarbyl-substituted succinic anhydrides, the hydrocarbyl-substituted succinic acid halides (especially the acid fluorides and acid chlorides), and the esters of the hydrocarbyl-substituted succinic acids and lower alcohols (e.g., those containing up to 7 carbon atoms), that is, hydrocarbyl-substituted compounds which can function as carboxylic acylating agents. Of these compounds, the hydrocarbyl-substituted succinic acids and the hydrocarbyl-substituted succinic anhydrides and mixtures of such acids and anhydrides are generally preferred, the hydrocarbyl-substituted succinic anhydrides being particularly preferred.

The acylating agent used in producing the dispersants useful in this invention is preferably made by reacting a polyolefin of appropriate molecular weight (with or without chlorine) with maleic anhydride. However, similar carboxylic reactants can be employed such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters.

The reaction between the amines, or alcohols, i) and ii) and the hydrocarbyl-substituted succinic acylating agent (component iii) is generally conducted at temperatures of 80° C. to 200° C., more preferably 100° C. to 180 ° C., such that a succinic acid ester and/or a succinic acid amide is formed. These reactions may be conducted in the presence or absence of an ancillary diluent or liquid reaction medium, such as a mineral lubricating oil solvent. Water is evolved and can be removed by azeotropic distillation during the course of the reaction. Suitable solvent oils include natural and synthetic base oils and high boiling hydrocarbon solvents such as toluene or xylene. The natural oils are typically mineral oils. Suitable synthetic diluents include polyesters, hydrogenated or unhydrogenated poly-alpha-olefins (PAO) such as hydrogenated or unhydrogenated 1-decene oligomer, and the like. Blends of mineral oil and synthetic oils are also suitable for this purpose.

The order of reacting components i), ii) and iii) is not particularly critical when component ii) contains only secondary amine groups or only secondary and tertiary amine groups. However, when component ii) contains a primary amine group, care must be taken to avoid forming succinimide groups by reacting the primary amines with all of the available succinic acylating agents thus leaving no available reactive sites for amine i) on the succinic acylating agent. The formation of undesired succinimides may be minimized by first reacting components i) and iii) in their desired proportions prior to the addition of component ii); in another embodiment, small amounts of component ii) containing primary amine groups may be added before or simultaneously with the addition of component i) so long as component ii) is present in an amount so as to provide less than 1 mole of primary amine per 1 mole of succinic acylating agent. Although some succinimide groups may form using this method, some hydrocarbyl-substituted succinic acylating agent capable of reacting with the hydroxyl-group containing component i) would still remain and the benefits of the invention still recognized.

Typically, the dispersant additives of the present invention are formed by reacting a hydrocarbyl-substituted succinic acylating agent (iii), a hydroxyl-group containing compound (i); an amine-group containing compound (ii) in the molar ratios of 1.0:0.2–1.8:0.2–1.8, preferably 1:0.5–1.5:0.5–1.5.

When formulating the fuel compositions of this invention, the dispersant additives (with or without other additives) are employed in an amount effective to improve the detergency of the fuel. Generally speaking the fuels of this invention will contain, on an active ingredient basis, an amount of dispersant additive in the range of about 1 to 1000 parts by weight of additive per million parts by weight of fuel.

An advantage of the present invention is that the additive reaction products do not detrimentally impact the combustion properties of the fuel. Further, the reaction products of the present invention can contribute lubricity benefits to the formulated fuel compositions. The improvements in the fuels lubricity will allow formulation with less, or even no, additional lubricity additive. Further, the improved fuel lubricity can reduce fuel pump wear.

The fuel compositions of the present invention may contain supplemental additives in addition to the reaction products described above. Said supplemental additives include supplemental dispersant/detergents, cetane improvers, octane improvers, antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives and combustion improvers.

Cyclopentadienyl manganese tricarbonyl compounds such as methylcyclopentadienyl manganese tricarbonyl are preferred combustion improvers because of their outstanding ability to reduce tailpipe emissions such as NOx and smog forming precursors and to significantly improve the octane quality of gasolines, both of the conventional variety and of the "reformulated" types.

The base fuels used in formulating the fuel compositions of the present invention 20 include any base fuels suitable for use in the operation of spark-ignition or compression-ignition internal combustion engines such as diesel fuel, jet fuel, kerosene, leaded or unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the present invention include methanol, ethanol, isopropanol, t-butanol, mixed C1 to C5 alcohols, methyl tertiary butyl ether, tertiary amyl methyl ether, ethyl tertiary butyl ether and mixed ethers. Oxygenates, when used, will normally be present in the base fuel in an amount below about 25% by volume, and preferably in an amount that provides an oxygen content in the overall fuel in the range of about 0.5 to about 5 percent by volume.

Any middle-distillate fuel may be used in the present invention, however, high-sulfur content fuels typically do not require additional lubricity additives. In a preferred embodiment, the middle-distillate fuel is a diesel fuel having a sulfur content of up to about 0.2% by weight, more preferably up to about 0.05% by weight, as determined by the test method specified in ASTM D 2622-98.

The additives used in formulating the preferred fuels of the present invention can be blended into the base fuel individually or in various sub-combinations. However, it is preferable to blend all of the components concurrently using an additive concentrate (i.e., additives plus a diluent, such as a hydrocarbon solvent). The use of an additive concentrate takes advantage of the mutual compatibility afforded by the combination of ingredients when in the form of an additive concentrate. Also, the use of a concentrate reduces blending time and lessens the possibility of blending errors.

The examples given below illustrate the novel fuel compositions of the present invention. Unless otherwise specified, all proportions are given by weight. The following examples are not intended or should not be construed as limitations of the invention as presently claimed.

EXAMPLE I

The dispersants were prepared as follows: Dispersants A-C were prepared by reacting components (i) and (ii), set forth below, with a polyisobutenyl succinic anhydride (component iii) derived from polyisobutene having a number average molecular weight of approximately 950 in xylenes at 145° C.

Dispersant A: Component i) was diethanolamine; and component ii) was 3,3'-iminobis (N,N-dimethyl propylamine) having the structure $HN[(CH_2)_3N(CH_3)_2]_2$.

Dispersant B: Component i) was diethanolamine; and component ii) was N-methyl piperazine.

Dispersant C: Component i) was diethanolamine; and component ii) was N,N-dimethylethanol amine having the structure $HO—C_2H_4—N(CH_3)_2$.

The efficacy of the detergent/lubricity additives of the present invention was assessed using the Scuffing Load BOCLE (ball-on-cylinder lubricity evaluator) test (ASTM D 6078-97). The Scuffing Load BOCLE test allows discrimination and ranking of fuels of differing lubricity. The Scuffing test simulates the severe modes of wear failure encountered in fuel pumps and therefore provides results which are representative of how the fuel would behave in service. The load at which wear failure occurs is referred to as the scuffing load and is a measure of the inherent lubricity of the fuel. The scuffing load is primarily identified by the size and appearance of the wear scar on the ball, which is considerably different in appearance to that found under milder non-scuffing conditions. Fuels giving a high scuffing load on failure have better lubricating properties than fuels giving a low scuffing load on failure. All Scuffing Load BOCLE tests were conducted in a Jet A fuel containing 115 ppm w/w of the dispersant.

The only diesel detergency test that has met any degree of acceptance in the U.S. is the Cummins L10 test. A low sulfur No. 2D diesel fuel was used for the L10 testing. The fuel containing 130 ppm w/w of a candidate additive is run in a Cummins L10 engine for 125 hours. At the end of the test, the injectors are removed and evaluated for plunger appearance. A trained rater inspects the plunger visually and assigns demerits following a Coordinating Research Council (CRC) protocol. CRC ratings for the six injectors are then averaged to give the test result. Lower CRC ratings indicate improved dispersancy/detergency.

TABLE 1

| Dispersant | SLBOCLE Load (g) | Average CRC Rating |
| --- | --- | --- |
| Base fuel only* | 1600 | 26.7[1] |
| A | 2400 | 7.3 |
| B | 2800 | 12.3 |
| C | 2800 | 14.9 |

*Comparative Examples not within the scope of the present invention
[1]Average of 3 runs It is clear, upon examination of the data in Table 1, that the fuel compositions containing the additives of the present invention exhibit both improved lubricity and improved detergency as compared to base fuel alone.

As natural lubricity of gasoline is on a noticeable decline since refining has become more severe in order to produce "low emissions gasolines", a fuel additive is required by the industry to ensure that fuel pumps will accomplish an acceptable working lifetime. Although diesel fuel pumps and injectors operate under more stringent conditions than gasoline fuel pumps (15,000 to 30,000 psi vs. 40–60 psi for gasoline engines), there is a trend in the automotive industry to increase fuel system pressures, such as in the case of DIG engines (1000 to 2000 psi), and thus the demands made upon gasoline fuel pumps will increase.

In certain regions of the United States such as California, "low emission", highly oxygenated gasoline blends will put further abrasive demands upon fuel pumps. Gasoline fuel pump failures will continue to increase and therefore the industry is presently searching for an additive that will overcome this problem. The automotive industry is thus in need of a lubricity agent for fuels as they become harsher as a result of increased refining to achieve lower emissions. Further, commercialization of gasoline direct injection technology equipped vehicles with gasoline fuel pumps operating at much higher injection pressures will require careful consideration of gasoline lubricity properties. Thus, the present invention addresses these needs in an efficient and economical manner.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the lubricity additive reaction products) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof As used herein the term "fuel-soluble" means that the substance under discussion should be sufficiently soluble at 20° C. in the base fuel selected for use to reach at least the minimum concentration required to enable the substance to serve its intended function. Preferably, the substance will have a substantially greater solubility in the base fuel than this. However, the substance need not dissolve in the base fuel in all proportions.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

What is claimed is:

1. A composition of matter consisting essentially of the product(s) obtained by reacting:
   (i) a diethanolamine;
   (ii) an amine-group containing compound selected from the group consisting of N-methyl piperazine, 3,3'-iminobis (N,N-dimethyl propylamine), and N,N-dimethylethanolamine; and
   (iii) a hydrocarbyl-substituted succinic acylating agent, wherein the amine-group containing compound (ii) comprises at least one member selected from the group consisting of a) polyamines containing at least one secondary amine group and optionally at least one tertiary amine group, b) tertiary amino alcohols containing at least one hydroxy group and at least one tertiary amine, c) alkylene polyamines of the formula $H_2N$—$(A$—$NH$—$)_nH$, where A is divalent ethylene or propylene and n is an integer of from 1 to 10 and d) polyamines having at least one primary amino group and at least one tertiary amino group; and
   wherein said product(s) are formed by reacting a hydrocarbyl-substituted succinic acylating agent (iii), a hydroxyl-group containing compound (i); and an amine-group containing compound (ii) in the molar ratios of 1.0:0.2–1.8:0.2–1.8, respectively.

2. The composition of claim 1 wherein the amine-group containing compound (ii) comprises N-methyl piperazine.

3. The composition of claim 1 wherein the amine-group containing compound (ii) comprises 3,3'-iminobis (N,N-dimethyl propylamine).

4. The composition of claim 1 wherein the amine-group containing compound (ii) comprises N,N-dimethylethanolamine.

5. A fuel composition comprising:
   (a) a major proportion of a liquid hydrocarbon fuel; and
   (b) a dispersant additive consisting essentially of the product(s) obtained by reacting:
      (i) a diethanolamine;
      (ii) an amine-group containing compound selected from the group consisting of N-methyl piperazine, 3,3'-iminobis (N,N-dimethyl propylamine), and N,N-dimethylethanolamine; and
      (iii) a hydrocarbyl-substituted succinic acylating agent, wherein the amine-group containing compound (ii) comprises at least one member selected from the group consisting of a) polyamines containing at least one secondary amine group and optionally at least one tertiary amine group, b) tertiary amino alcohols containing at least one hydroxy group and at least one tertiary amine, c) alkylene polyamines of the formula $H_2N$—$(A$—$NH$—$)_nH$, where A is divalent ethylene or propylene and n is an integer of from 1 to 10 and d) polyamines having at least one primary amino group and at least one tertiary amino group; and
   wherein said dispersant additive is formed by reacting a hydrocarbyl-substituted succinic acylating agent (iii), a diethanolamine (i); and an amine-group containing compound (ii) in the molar ratios of 1.0:0.2–1.8:0.2–1.8, respectively.

6. The fuel composition of claim 5 wherein said dispersant is present in the fuel composition in an amount within the range of from about 1 to about 1000 parts of additive by weight per million parts by weight of fuel.

7. The fuel composition of claim 6 wherein said dispersant is present in an amount within the range of from about 10 to about 500 parts of additive by weight per million parts, by weight of fuel.

8. The fuel composition of claim 7 wherein said dispersant is present in an amount within the range of from about 30 to about 300 parts of additive by weight per million parts by weight of fuel.

9. The fuel composition of claim 5 wherein the amine-group containing compound (ii) comprises N-methyl piperazine.

10. The fuel composition of claim 5 wherein the amine-group containing compound (ii) comprises 3,3'-iminobis (N,N-dimethyl propylamine).

11. The fuel composition of claim 5 wherein the amine-group containing compound (ii) comprises N,N-dimethylethanol amine.

12. A fuel composition according to claim 5 wherein said liquid hydrocarbon fuel comprises a compression-ignition fuel selected from the group consisting of diesel, biodiesel, jet fuel and kerosene.

13. A fuel composition according to claim 12 wherein said compression-ignition fuel has a sulfur content below 0.2% by weight.

14. A fuel composition according to claim 5 wherein said liquid hydrocarbon fuel comprises a spark-ignition fuel selected from the group consisting of gasoline and reformulated gasolines.

15. A fuel composition according to claim 5 wherein said fuel composition further comprises at least one additive selected from the group consisting of supplemental dispersants/detergents, octane improvers, cetane improvers, carrier fluids, demulsifiers, antioxidants, antifoam agents, anti-icing additives, biocides, combustion improvers, alkali or alkaline-earth metal detergents, drag reducers, metal deactivators, lubricity additives, dyes, markers, odor masks, odorants and stability improvers.

16. A method of minimizing or reducing deposits in a compression-ignition internal combustion engine, said method comprises providing as fuel for the operation of said engine a fuel in accordance with claim 12.

17. A method of minimizing or reducing deposits in a spark-ignition internal combustion engine, said method comprises providing as fuel for the operation of said engine a fuel in accordance with claim 14.

* * * * *